(12) United States Patent
Santoro (10) Patent No.: US 11,249,236 B2
(45) Date of Patent: Feb. 15, 2022

(54) LIGHT GUIDE (71) Applicant: Fluxwerx Illumination Inc., Langley (CA)

(72) Inventor: Scott Santoro, Delta (CA)

(73) Assignee: LMPG INC., Surrey (CA)

( * ) Notice: Subject to any disclaimer, the term of this patent is extended or adjusted under 35 U.S.C. 154(b) by 0 days.

(21) Appl. No.: 16/963,769

(22) PCT Filed: Jan. 25, 2019

(86) PCT No.: PCT/CA2019/050089
§ 371 (c)(1),
(2) Date: Jul. 21, 2020

(87) PCT Pub. No.: WO2019/144233
PCT Pub. Date: Aug. 1, 2019

(65) Prior Publication Data
US 2021/0041615 A1 Feb. 11, 2021

Related U.S. Application Data (60) Provisional application No. 62/621,822, filed on Jan. 25, 2018.

(51) Int. Cl.
*G02B 6/00* (2006.01)
*F21V 8/00* (2006.01)
(52) U.S. Cl.
CPC ......... *G02B 6/0016* (2013.01); *G02B 6/0045* (2013.01); *G02B 6/0068* (2013.01)

(58) Field of Classification Search
CPC .. G02B 6/0016; G02B 6/0045; G02B 6/0068; G02B 6/0021; G02B 6/0036; G02B 6/0046; G02B 6/0073
See application file for complete search history.

(56) References Cited

U.S. PATENT DOCUMENTS

| | | | |
|---|---|---|---|
| 7,717,598 B2 | 5/2010 | Kakizaki et al. | |
| 7,942,565 B2 | 5/2011 | Klick et al. | |
| 8,439,548 B2 | 5/2013 | Hong | |
| 8,876,355 B2 | 4/2014 | Nomoto et al. | |
| 8,842,366 B2 | 9/2014 | Arnett et al. | |
| 2009/0080038 A1* | 3/2009 | Hayashide | H04N 1/02835 358/475 |
| 2012/0075883 A1 | 3/2012 | Chen | |
| 2012/0098794 A1 | 4/2012 | Kleinert et al. | |

(Continued)

FOREIGN PATENT DOCUMENTS

EP 2327340 A1 6/2011
JP H09152360 A 6/1997

*Primary Examiner* — Y M. Quach Lee
(74) *Attorney, Agent, or Firm* — Oyen Wiggs Green & Mutala LLP (57) ABSTRACT

A light guide for luminaires is disclosed. In some embodiments the light guide is oriented to receive light from a point light source at a light receiving surface configured to refract incoming light at angles to enable total internal reflection (TIR) of the light down the body of the light guide without loss of light. A foot at the bottom of the body of the light guide includes a first sloped face wherefrom a portion of the light is extracted downward toward a work plane in a batwing distribution and a second sloped face and a return face wherefrom the remaining light is extracted upward.

18 Claims, 14 Drawing Sheets

(56) References Cited

U.S. PATENT DOCUMENTS

2014/0340927 A1* 11/2014 Johnston .............. G02B 6/0046
 362/555
2016/0327724 A1* 11/2016 Wu ...................... G02B 6/0021

* cited by examiner

LIGHT GUIDE

REFERENCE TO RELATED APPLICATIONS

This application claims priority to, and the benefit of, U.S. Provisional Patent Application No. 62/621,822 filed 25 Jan. 2018, which is incorporated by reference herein in its entirety.

TECHNICAL FIELD

This invention relates to light guides for luminaires.

BACKGROUND

Luminaires that utilize point light sources such as light emitting diodes (LEDs) use light guides to receive light from the point light source and guide the light to be extracted from extraction elements of the light guide in a controlled manner.

One objective in lighting is to provide even illuminance on a work plane, which can be achieved by providing a lighting distribution known in the art as a "batwing" distribution. Another objective in lighting is to eliminate or reduce glare. Glare is an effect of luminance at high vertical angles that can cause visual discomfort to users.

Luminance of a luminaire is determined by dividing luminous intensity by projected area at a particular angle.

A further objective in lighting is to emit visually homogenous light. Light travels through the light guide by way of total internal reflection until it is extracted. In conventional light guides light is internally reflected through the guide in an uninterrupted linear path in the plane perpendicular to the normal of the flat sides of the light guide. In conventional light guides, when the light is extracted by extraction elements the light can appear to the viewer as undesirable visible lines of light emanating from the light sources. The visual definition of these lines, or "head lamping", can vary depending on the type of extraction elements used, the distance between the extraction elements and the light source(s), and the width or thickness of the light guide. Reducing or eliminating these visible lines of light, and emitting light which is more visually homogenous across the emitting surface, are desirable.

BRIEF DESCRIPTION OF THE DRAWINGS

In drawings which show non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The term "outwardly" as used in this specification refers to a direction laterally away from the body of the light guide.

The terms "upper", "upward", and "upwardly" as used in this specification refers to a direction toward from where the light source is located.

The terms "lower", "downward", and "downwardly" as used in this specification refer to a direction away where the light source is located.

The term "horizontal" as used in this specification refers to a direction parallel to the horizontal plane, while the term "vertical" refers to a direction perpendicular to the horizontal plane.

Aspects of the invention relate to vertically oriented light guides that receive light from point light sources at a light receiving surface configured to refract incoming light at higher angles to meet the condition for total internal reflection (TIR) of the light down the body of the light guide without loss of light. A foot at the bottom of the body of the light guide includes a first sloped face wherefrom a portion of the light is extracted downward toward a work plane in a batwing distribution and a second sloped face and a return face wherefrom the remaining light is extracted upward.

Figure 1:
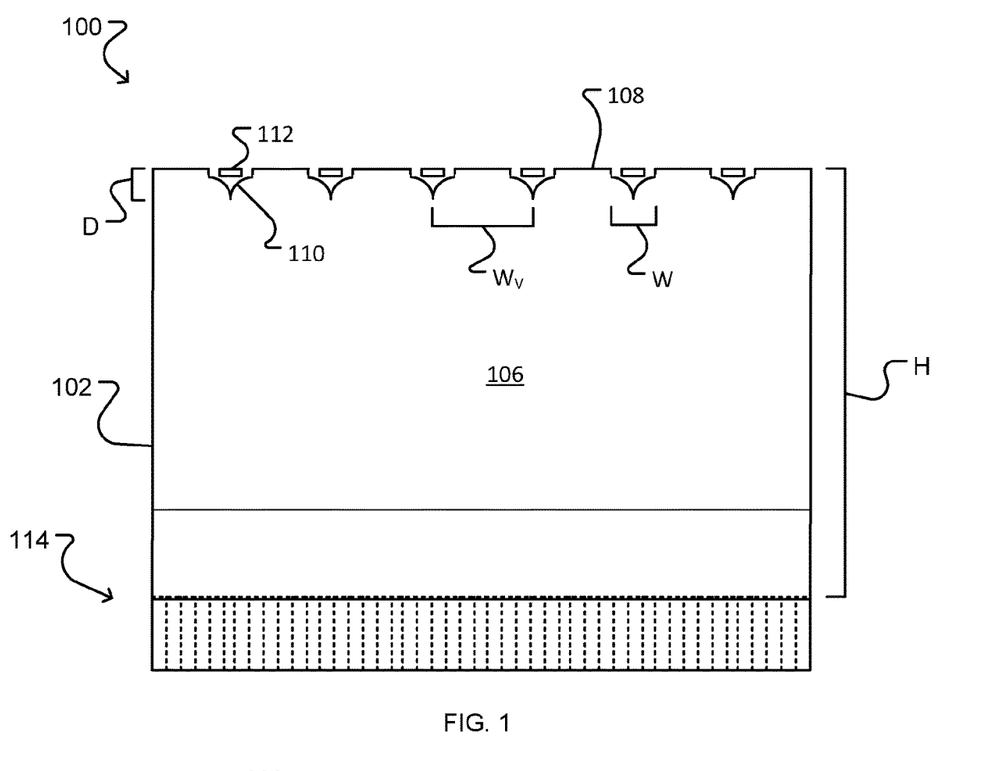
FIG. 1 is a front view of a light guide according to an embodiment of the invention.
Figure 2:
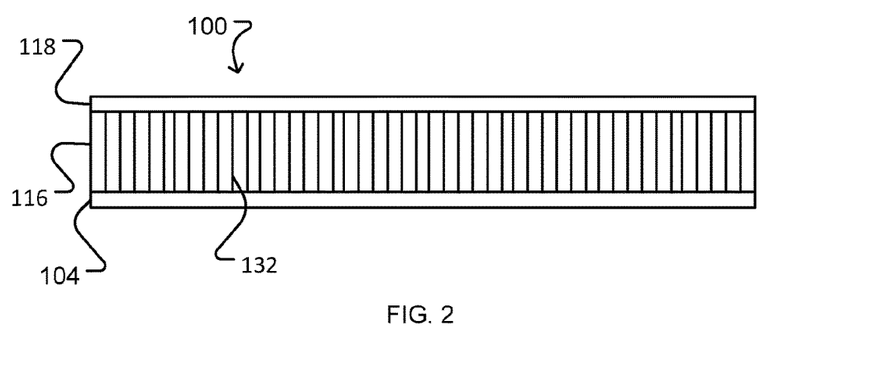
FIG. 2 is a bottom view of a light guide of the embodiment shown in FIG. 1.
Figure 3:
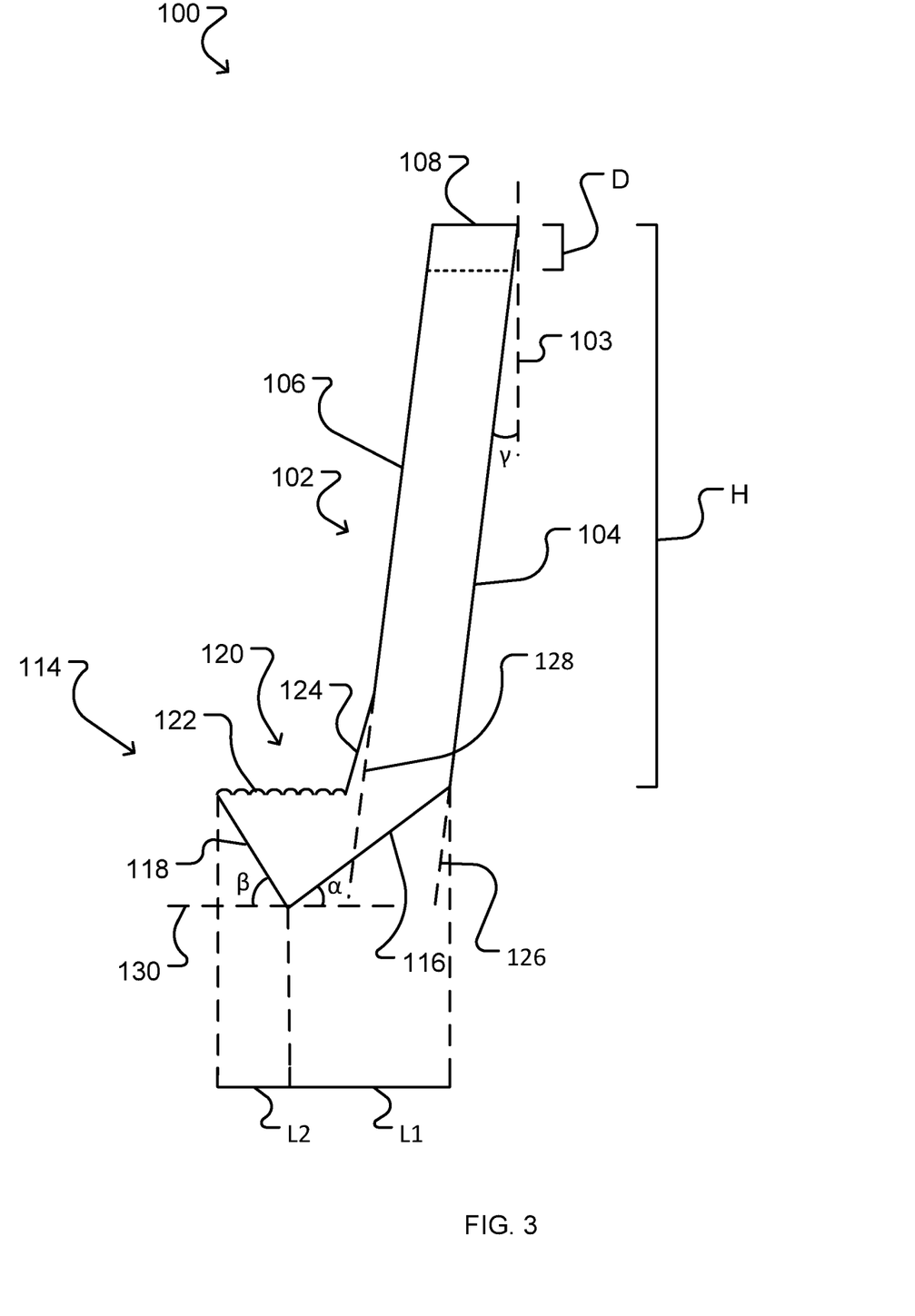
FIG. 3 is an end view of a light guide of the embodiment shown in FIG. 1.

FIGS. 1 to 3 show a light guide 100 according to an embodiment of the invention. Light guide 100 has a generally planar rectangular body 102 with an inner major surface 104 and an outer major surface 106. Inner major surface 104 and an outer major surface 106 are smooth. Body 102 is made of a clear, rigid material such as polymethyl acrylate (PMMA) or polycarbonate (PC). Viewed from the side as shown in FIG. 3, body 102 slopes outwardly at an angle $\gamma$ off the vertical plane 103. In some embodiments, angle $\gamma$ is no greater than 5 degrees in order maintain TIR of light entering surface 108. In some embodiments surfaces 104 and 106 could be slightly curved to maintain TIR. In some embodiments, surfaces 104 and 106 could diverge from each other as they get further from surface 108 to maintain TIR. In some embodiments, angle $\gamma$ is zero, i.e., body 102 is vertically oriented.

Figure 5:
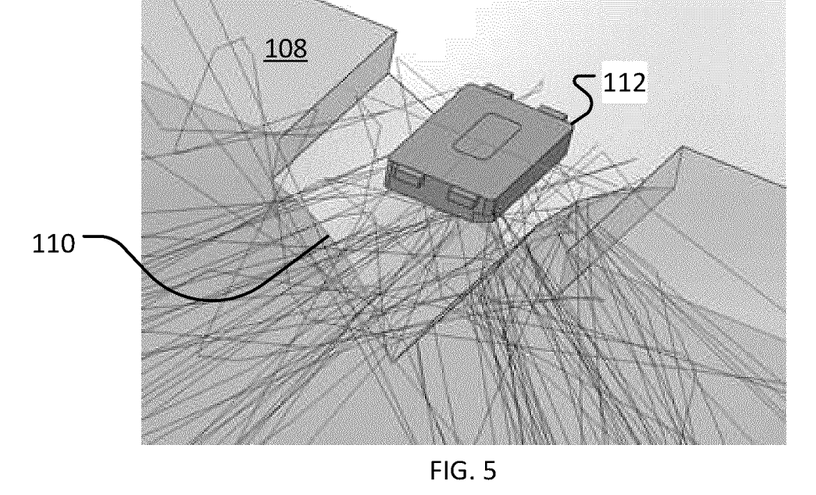
FIG. 5 shows paths of exemplary light rays emitted by a light source and transmitted to a light receiving surface of a light guide of the embodiment shown in FIG. 1 from a top isometric close up view.
Figure 6:
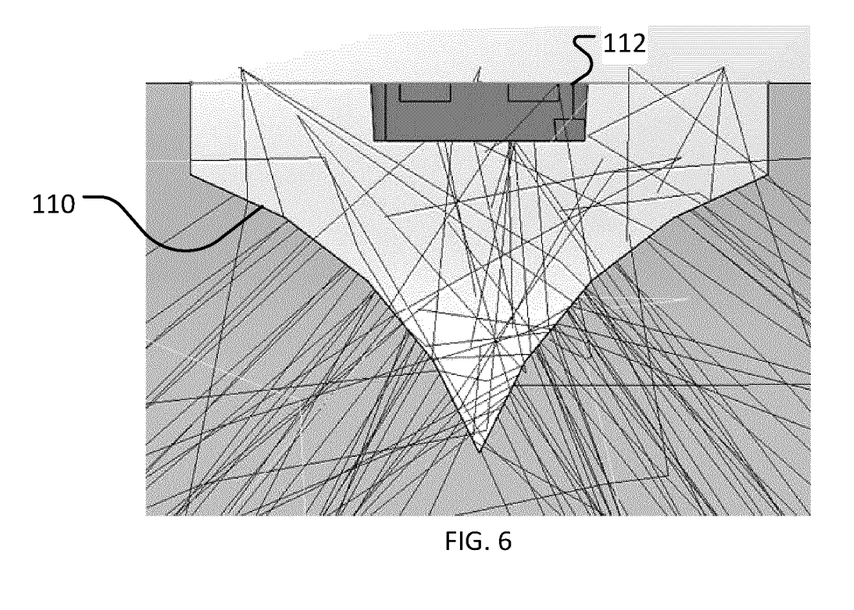
FIG. 6 shows paths of exemplary light rays emitted by a light source and transmitted to a light receiving surface a light guide of the embodiment shown in FIG. 1 from a front close up view.

An upper edge 108 of body 102 is provided with light receiving surfaces, in particular spaced apart grooves 110 for receiving therein a point light source 112. The surfaces of grooves 110 are preferentially clear. Grooves 110 extend from inner major surface 104 to outer major surface 106. In other embodiments, grooves 110 may extend only partially between inner major surface 104 and outer major surface 106. Grooves 110 may have a cross-section partially defined by rounded V-shapes, as shown in FIG. 1 where the cross-section of grooves 110 comprises stepped and rounded V-shapes. FIGS. 5 and 6 show ray traces of light from a light source 112 refracting into groove 110.

Figure 13:
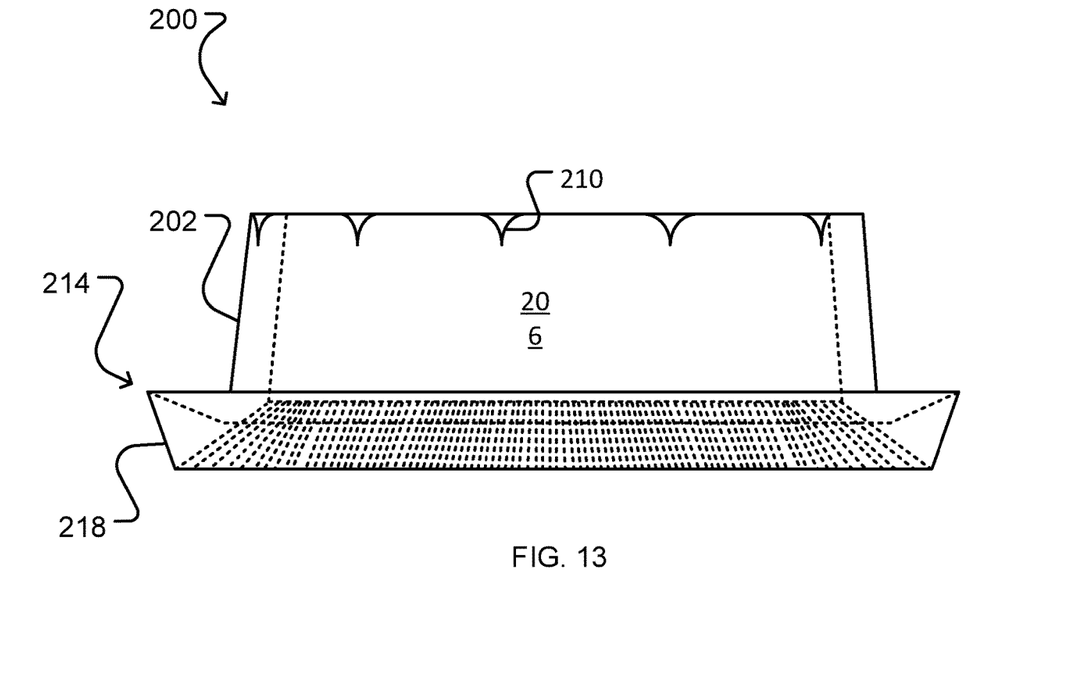
FIG. 13 is a side view of a light guide according to an embodiment of the invention.
Figure 14:
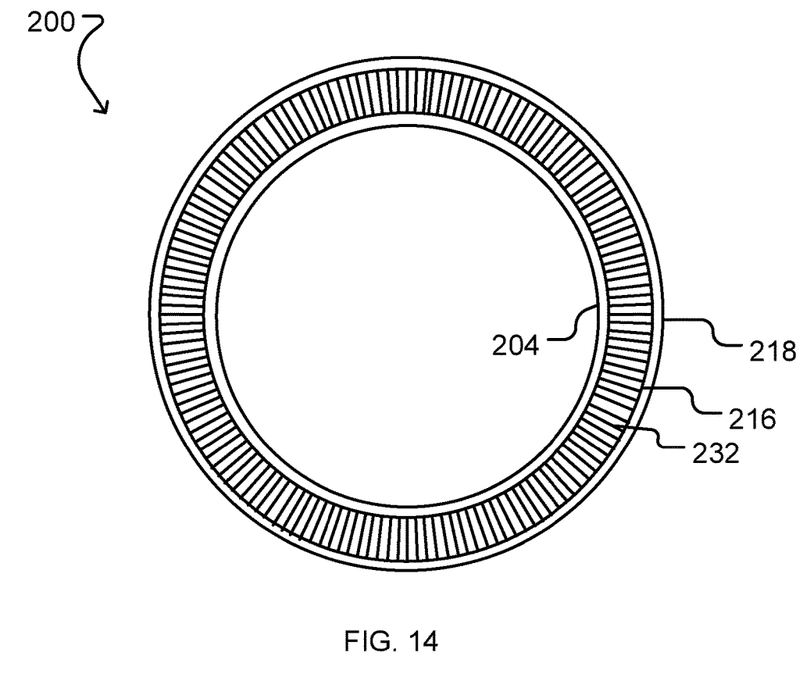
FIG. 14 is a bottom view of a light guide of the embodiment shown in FIG. 13.
Figure 15:
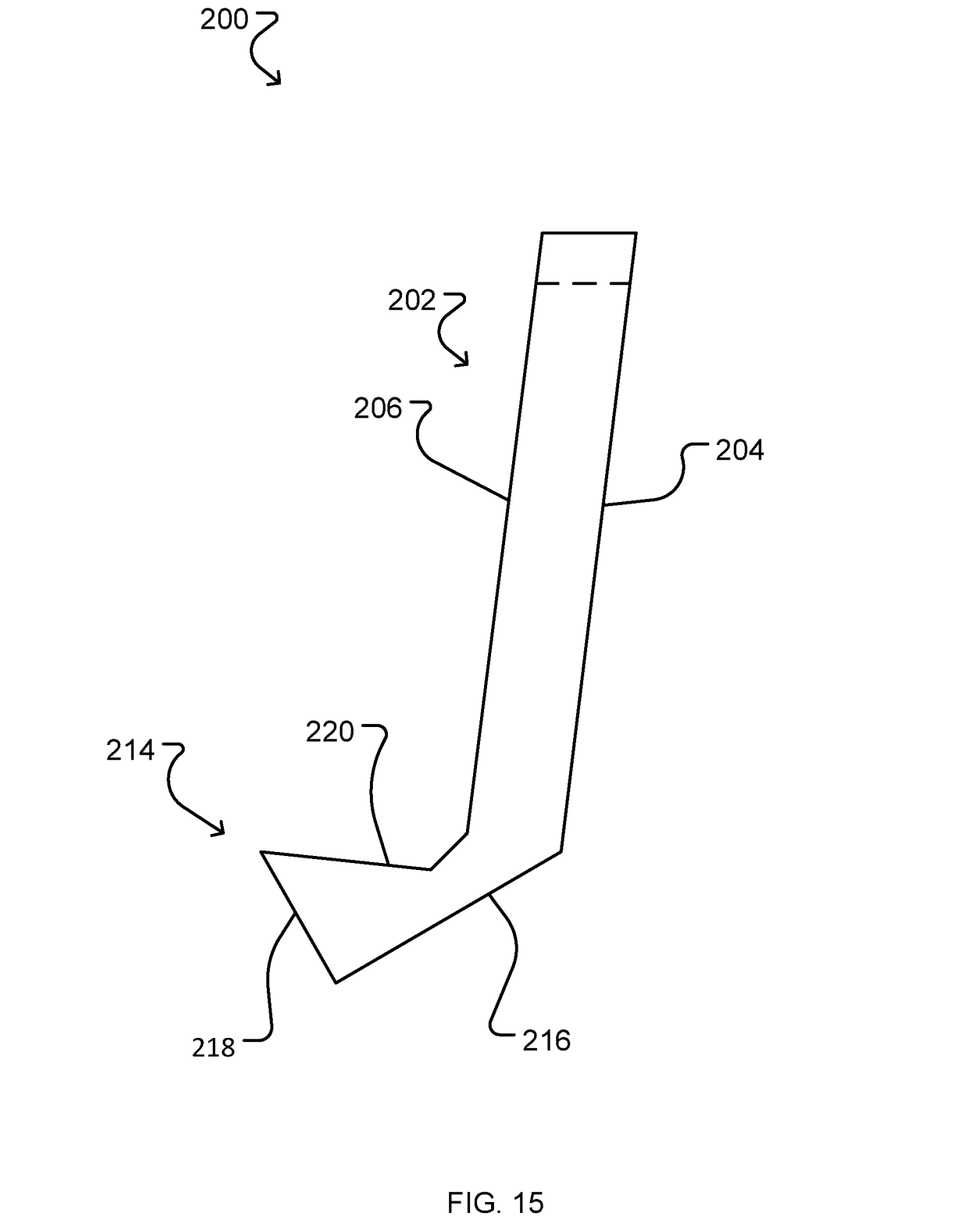
FIG. 15 is a cross sectional end view of a light guide of the embodiment shown in FIG. 13.
Figure 16:
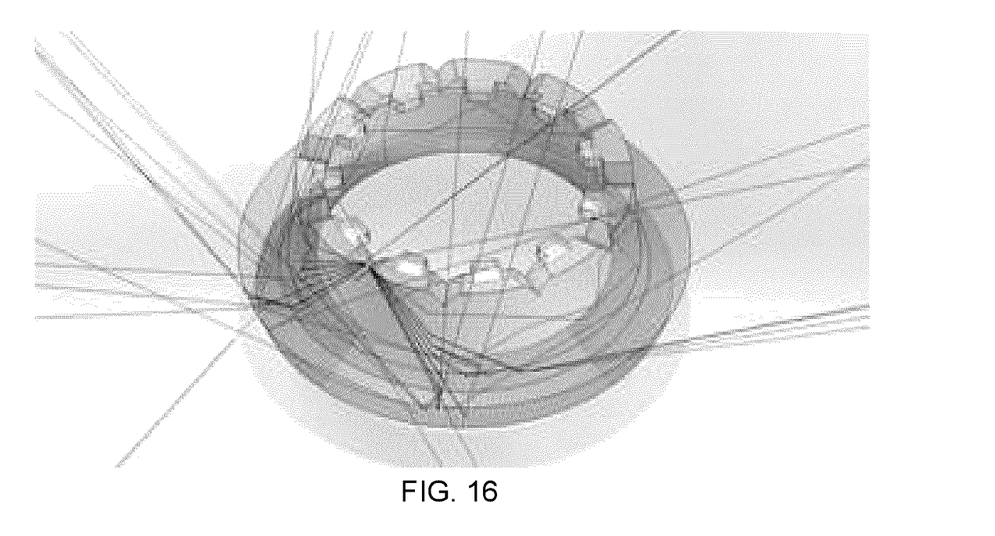
FIG. 16 shows paths of exemplary light rays internally reflecting within and extracted out of a light guide of the embodiment shown in FIG. 13 from a top isometric view.
Figure 17:
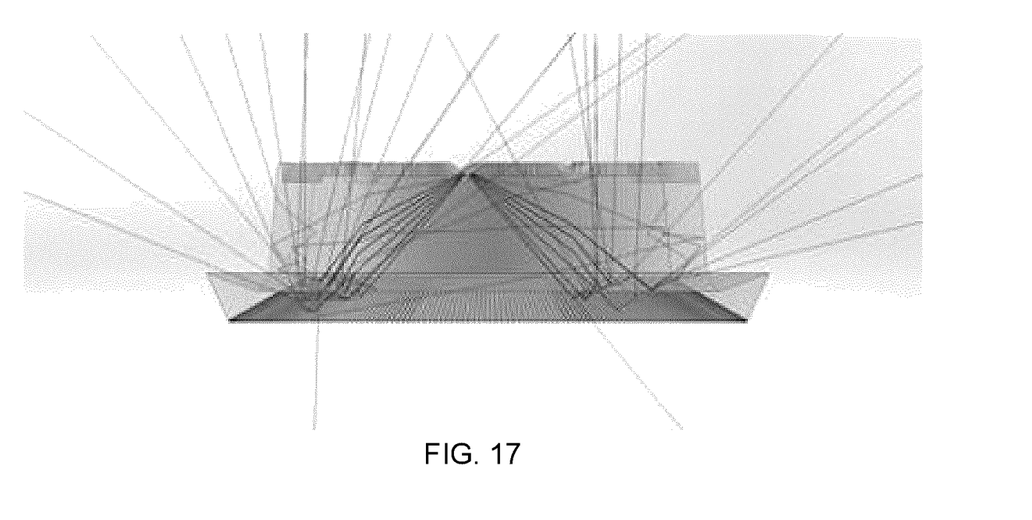
FIG. 17 shows paths of exemplary light rays internally reflecting within and extracted out of a light guide of the embodiment shown in FIG. 13 from a side view.
Figure 18:
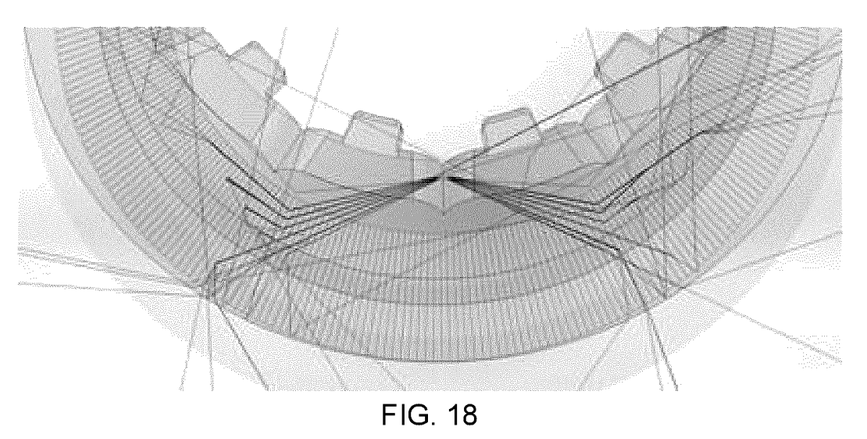
FIG. 18 shows paths of exemplary light rays internally reflecting within and extracted out of a light guide of the embodiment shown in FIG. 13 from a partial top view.
Figure 19:
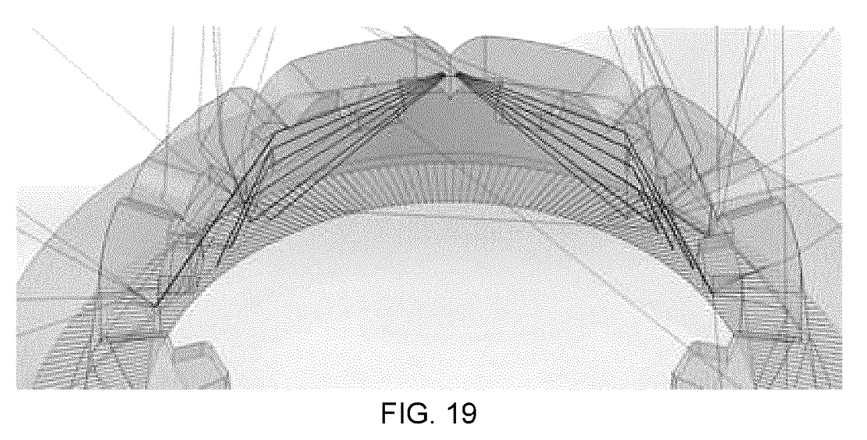
FIG. 19 shows paths of exemplary light rays internally reflecting within and extracted out of a light guide of the embodiment shown in FIG. 13 from a partial top isometric view.
Figure 21A:
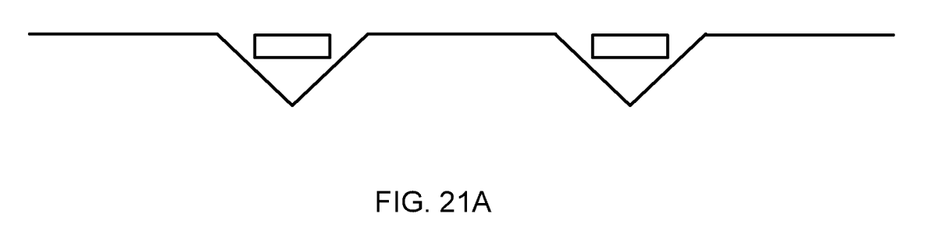
FIGS. 21A to 21C are partial side views of various light receiving surfaces according to embodiments of the invention, shown with light sources.
Figure 21B:
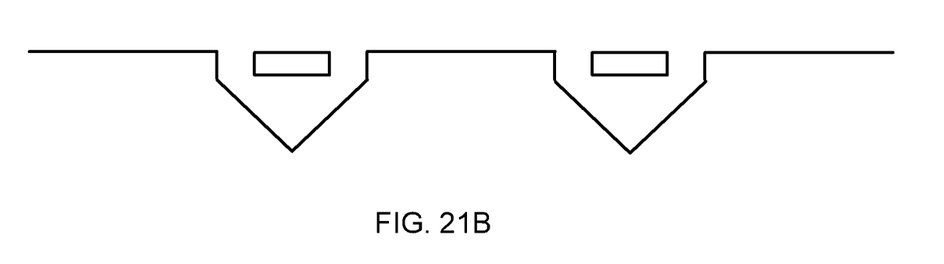
Figure 21C:
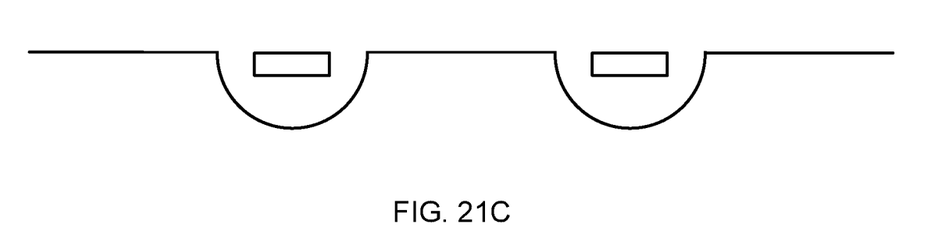

In other embodiments the cross-section of the grooves may consist of rounded V-shapes (as shown in the embodiment of FIGS. 13-15). In other embodiments the cross-section of the grooves may consist of a straight V-shape (as shown in FIG. 21A), stepped straight V-shapes (as shown in FIG. 21B), semi-circles (as shown in FIG. 21C), and the like. In some embodiments, cross-section of the grooves may be any shape suitable for receiving a point light source therein and refracting light therefrom into body 102 at sufficiently high angles such that the light is transmitted down body 102 by TIR. Sufficiency of the angle depends on the depth of guide 100 and the distance between light sources 112. The deeper guide 100 and or less distance between light sources 112 requires less of an angle to create a homogeneous luminance leaving fluted surface 232.

Figure 7:
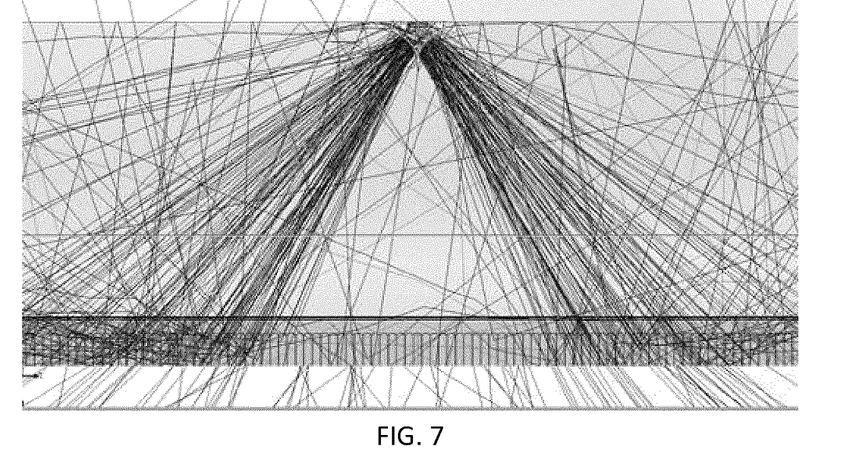
FIG. 7 shows paths of exemplary light rays emitted by a light source and internally reflecting within and extracted out of a foot of a light guide of the embodiment shown in FIG. 1 from a front view.
Figure 8:
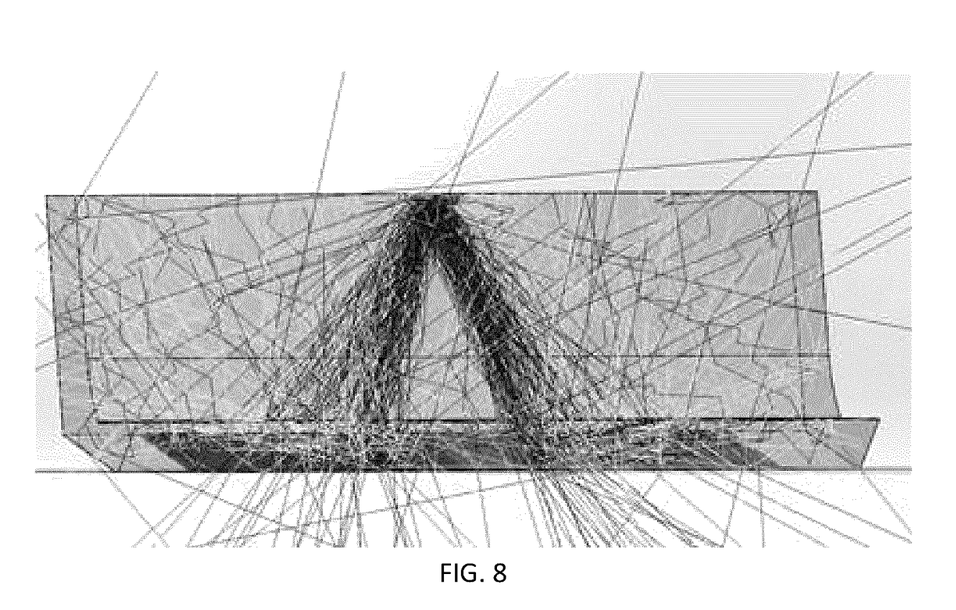
FIG. 8 shows paths of exemplary light rays emitted by a light source and internally reflecting within and extracted out of a foot of a light guide of the embodiment shown in FIG. 1 from a front isometric view.

As shown in FIGS. 7 and 8, light rays from a single light source 112 in a single groove 110 spreads through body 102 in two beams in a generally upside-down V-shape. Grooves 110 have a depth D, width W, and a width $W_V$ between vertices of adjacent grooves. Body 102 has a height H defined as the length from upper edge 108 to where body 102 meets foot 114. In some embodiments, the ratios between depth D, width W, width $W_V$ and/or height H may be maintained within certain ranges to provide optimal and even light transmission across foot 114. In some embodiments, height H is about 1.5 to 3 times, or about 2 times, width $W_V$. In some embodiments, width W is about 1 to 2 times depth D.

As shown in FIG. 8, where body 102 is a linear (or otherwise not a closed shape) light can escape from the side edges of body 102. To limit this effect, the side edges of body 102 may be capped, or sufficient distance may be provided between the edge-most light sources and the side edges of body 102.

Foot 114 extends from a lower edge of body 102, opposite upper edge 108. Foot 114 is integral with and made of the same material as body 102. As best shown in FIG. 3, foot 114 includes an outwardly and downwardly sloping first face 116, an outwardly and upwardly sloping second face 118, and at least one return face 120. In the illustrated embodiment, return face 120 includes a horizontal return face 122 and a sloping return face 124.

First face 116 is adjacent inner major surface 104 and in the embodiment illustrated adjoins inner major face 104. In other embodiments, first face 116 and inner major face 104 may be connected for example by a rounded edge portion or a small intervening face. First face 116 extends from about a plane 126 of inner major surface 104 to beyond a plane 128 of outer major surface 106. Angle $\alpha$ is defined between first face 116 and a horizontal plane 130. Angle $\alpha$ determines glare control and the amount of light reflected versus transmitted out of surface 116. Angle $\alpha$ may be about 10 to 40 degrees, or about 30 degrees.

First face 116 is provided with flutes 132 to homogenize extracted light and reduce or eliminate head lamping effects. Flutes 132 run parallel to the direction that first face 116 extends from inner major surface 104. In other embodiments the surface of first face 116 may be provided with other means to homogenize extracted light. In some embodiments, diffuse refraction may be provided at or adjacent the surface of the face. For example, diffuse refraction may be achieved by providing a diffuse surface on the face, overlaying a diffuse film on the face, providing a diffuse material within the light guide immediately underneath the face, and the like. In some embodiments, the diffusion may be in a linear pattern (e.g. ridges or grooves aligned horizontally across the face), while in other embodiments the diffusion may be non-linear or random (e.g. randomly arranged bumps or dimples or a frosted finish).

Second face 118 is adjacent first face 116 and in the embodiment illustrated adjoins first face 116. In other embodiments, first face 116 and second face 118 may be connected for example by a rounded edge portion or a small intervening face. Second face 118 may extend upwardly to about a height where first face 116 adjoins inner major face 104.

Angle $\beta$ is defined between second face 118 and a horizontal plane 130. Angle $\beta$ determines the amount and angle of light which is bent leaving the surface 118 upward to illuminate the cavity above. Some of this light is also internally reflected (the amount and angle also determined by angle $\beta$) off surface 118 up towards the upper surface 120 where it is then refracted out upward to illuminate the surface above. Angle $\beta$ may be about 30 to 75 degrees, or about 65 degrees.

Second face 118 and return faces 122, 124 may be clear or provided with diffuse surfaces feature as described above. In the illustrated embodiment, second face 118 is frosted, return face 122 is dimpled, and return face 124 is clear.

The horizontally projected length L1 of first face 116 is greater than the horizontally projected length L2 of second face 118. In some embodiments the ratio of horizontally projected length L1 of first face 116 to horizontally projected length L2 of second face 118 is between 2:1 to 4:1, or about 2.5:1 to 3.5:1, or about 3:1.

Figure 4:
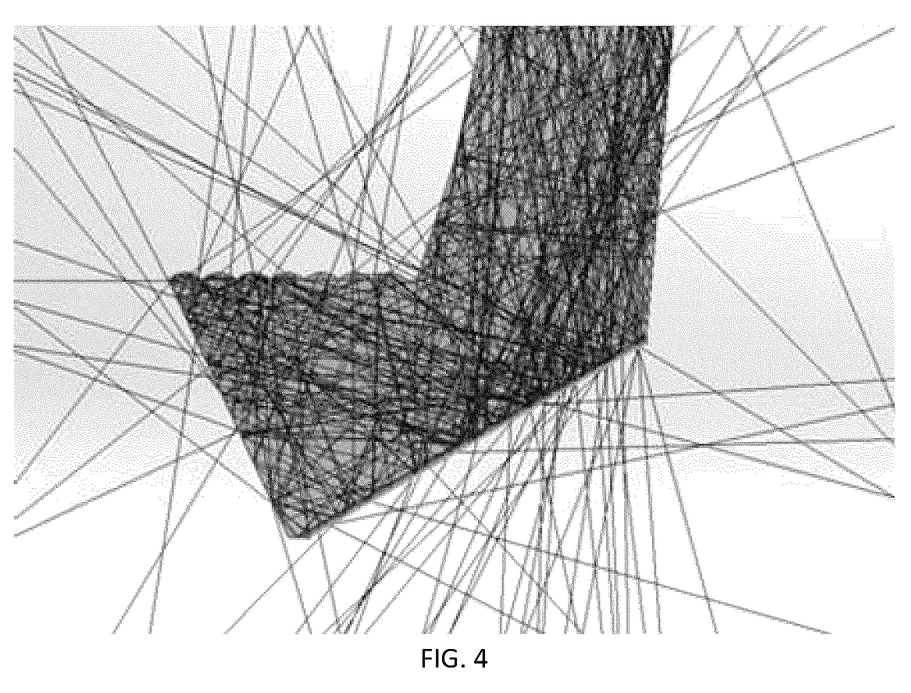
FIG. 4 shows paths of exemplary light rays internally reflecting within and extracted out of a foot of a light guide of the embodiment shown in FIG. 1 from an end view.
Figure 9:
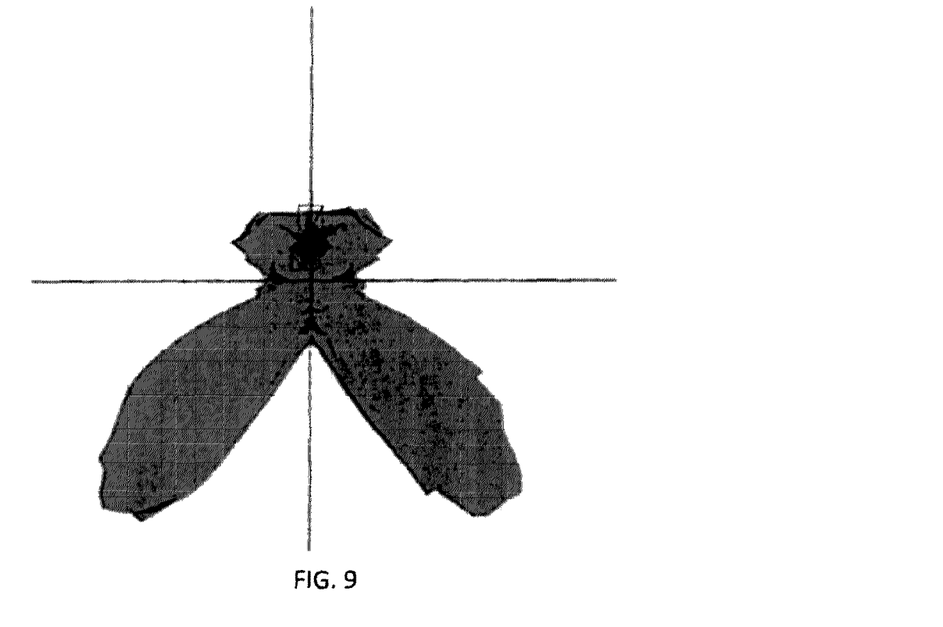
FIG. 9 is a polar plot of light distribution displaying how light leaves from a front view of a light guide of the embodiment shown in FIG. 1.
Figure 10:
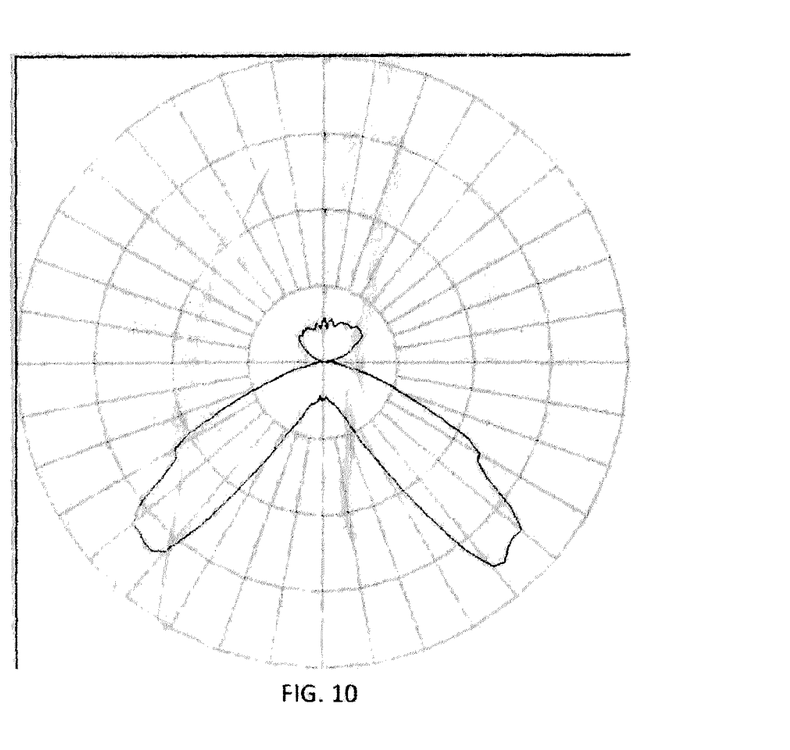
FIG. 10 is a polar plot of light distribution of a light guide of the embodiment shown in FIG. 1 from a top view.
Figure 11:
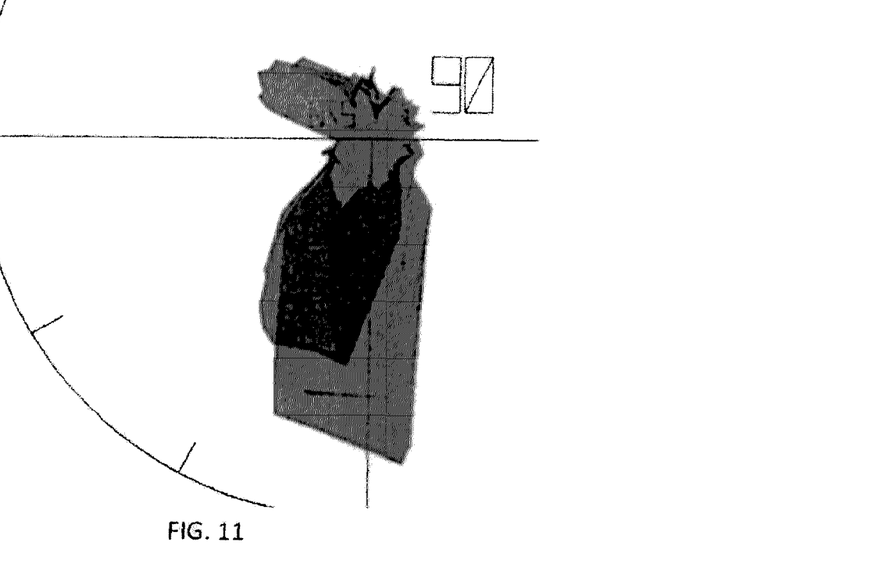
FIG. 11 is a polar plot of light distribution displaying how light leaves from an end view of a light guide of the embodiment shown in FIG. 1.
Figure 12:
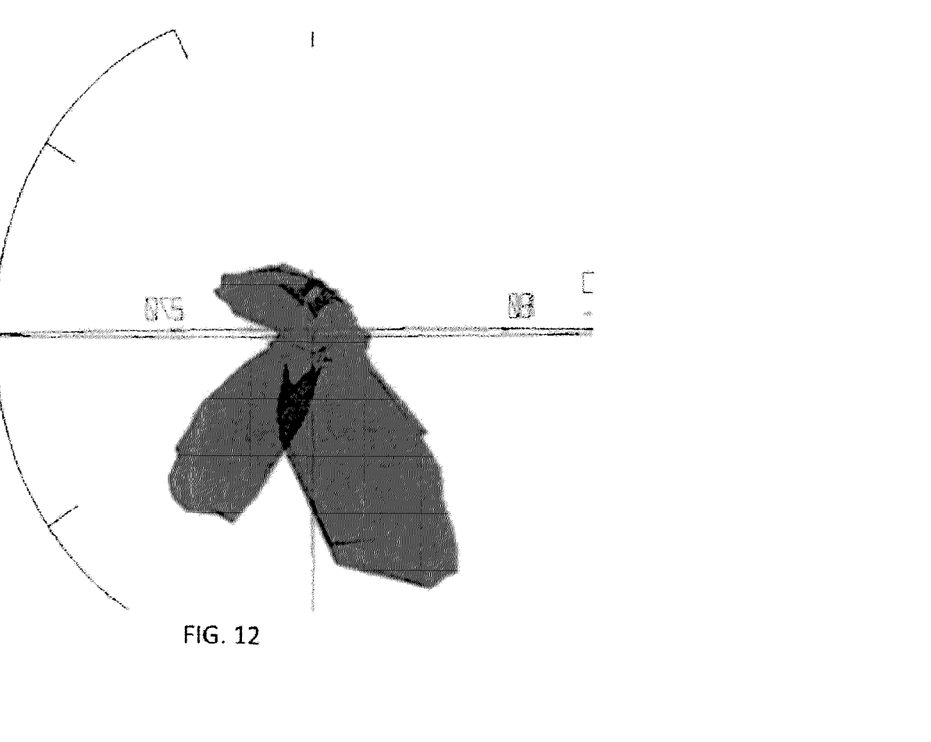
FIG. 12 is a polar plot of light distribution displaying how light leaves from a 45 degree end view of a light guide of the embodiment shown in FIG. 1.

As shown in FIG. 4, light is extracted at first face 116 and refracted generally downward toward a work plane, and the remaining light is extracted at second face 118 and return face 122 and refracted generally upward (for example to illuminate a top reflector of a luminaire). As shown by the polar plots in FIGS. 9, 11 and 12, light emitted by a single light source 112 in a light guide 100, and is extracted at foot 114 in an ideal batwing distribution shown in the lower hemisphere of the plots. FIG. 10 shows a polar plot of a single light source distribution from above.

FIGS. 13 to 15 show a light guide 200 according to another embodiment of the invention. Unlike the linear body 102 of light guide 100, light guide 200 has a generally annular body 202. The closed loop configuration of light guide 200 obviates the problem of light escaping from the side edges of light guide 100. The features and functions of light guide 200 otherwise correspond to those of light guide 100 as described above. For example, the features and functions of inner major surface 204, outer major surface 206, grooves 210, foot 214, first face 216, second face 218, return face 220 and flutes 232 of light guide 200 correspond to inner major surface 104, outer major surface 106, grooves 110, foot 114, first face 116, second face 118, return face 120 and flutes 132 of light guide 100.

Figure 20:
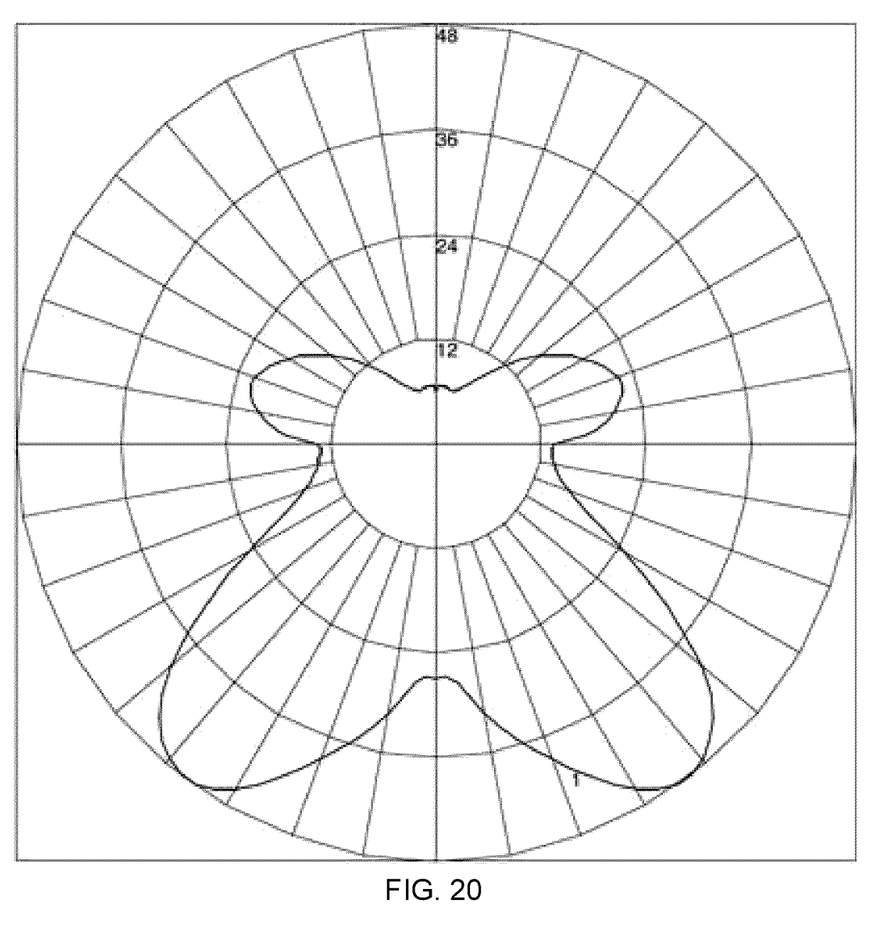
FIG. 20 is a polar plot of light distribution of a light guide of the embodiment shown in FIG. 13 from a side view.

FIGS. 16 to 19 show exemplary light ray traces from a single light source with light guide 200. The polar plot shown in FIG. 20 shows that light emitted by a single light source in a light guide 200 is extracted at foot 214 in an ideal batwing distribution shown in the lower hemisphere of the plot.

Figure 22A:
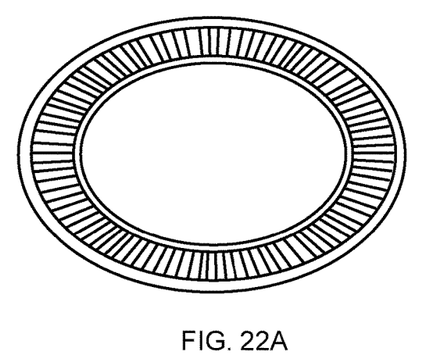
FIGS. 22A to 22D are bottom views of various light guides according to embodiments of the invention.
Figure 22B:
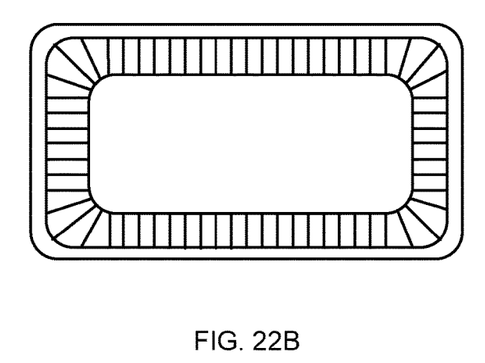
Figure 22C:
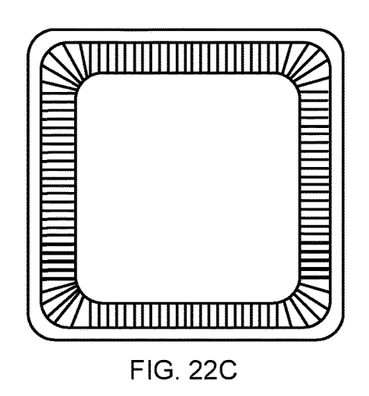
Figure 22D:
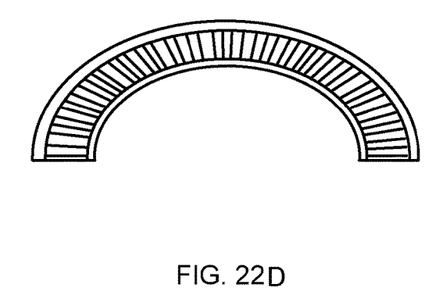

As a further example of variations, other shapes of the body of light guides are possible. For example, some embodiments may be oval (FIG. 22A), rectangular (FIG. 22B), square (FIG. 22C), an arc (FIG. 22D) or the like. Where the light guide has corners, such as in polygonal configurations such as rectangles and squares, the corners are sufficiently rounded to ensure total internal reflection of light at the corners and prevent escape of light before light reaches the foot of the light guide.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A light guide comprising:
   a body comprising:
      an inner major surface;
      an outer major surface opposite the inner major surface; and
   an upper edge comprising a light receiving surface comprising a plurality of spaced apart grooves;
   a foot continuous with the body and opposite the upper edge, the foot comprising:
      an outwardly and downwardly sloping first face for extracting light, the first face adjacent the inner major surface and extending from about a plane of the inner major surface to beyond a plane of the outer major surface;
      an outwardly and upwardly sloping second face for extracting light, the second face adjacent the first sloped face;
         at least one return face connecting the second face to the outer major surface, wherein the body has a circular cross-section and the first face, second face, and return face are circular.

2. A light guide according to claim 1 wherein one end of the first face adjoins the inner major surface and another end of the first face adjoins the second face.

3. A light guide according to claim 1 wherein the body is clear.

4. A light guide according to claim 1 wherein the first face comprises a plurality of flutes.

5. A light guide according to claim 1 wherein the first face is diffuse.

6. A light guide according to claim 1 wherein an angle α between the first face and a horizontal plane is about 10 to 40 degrees, or about 30 degrees.

7. A light guide according to claim 1 wherein the second face is diffuse.

8. A light guide according to claim 1 wherein the second face is clear.

9. A light guide according to claim 1 wherein an angle β between the second face and a horizontal plane is about 60 to 80 degrees, or about 65 to 75 degrees, or about 70 degrees.

10. A light guide according to claim 1 wherein the plurality of spaced apart grooves are spaced evenly apart and each configured to receive a point light source.

11. A light guide according to claim 1 wherein the plurality of spaced apart grooves have cross-sections at least partially defined by rounded V-shapes.

12. A light guide according to claim 11 wherein a height H of the body is about 1.5 to 3 times, or about 2 times, the width Wv.

13. A light guide according to claim 12 wherein a height H of the body is about 1 to 2 times, a width W of the spaced apart grooves.

14. A light guide according to claim 1 wherein a horizontally projected length L1 of the first face 116 is greater than a horizontally projected length L2 of the second face.

15. A light guide according to claim 14 wherein the ratio of the length L1 to the length L2 is between 2:1 to 4:1, or about 2.5:1 to 3.5:1, or about 3:1.

16. A light guide according to claim 1 wherein the body comprises a right circular cylindrical shape.

17. A light guide according to claim 1 wherein the body is a right truncated conical shape.

18. A luminaire comprising:
   a housing;
   a light guide according to claim 1;
   a plurality of point light sources, each light source received in a corresponding one of the plurality of spaced apart grooves;
   whereby light from each light source spreads from the light receiving surface to the foot and is extracted at least the first face and the second face.

\* \* \* \* \*